United States Patent
Kobayashi et al.

(10) Patent No.: US 6,415,746 B2
(45) Date of Patent: Jul. 9, 2002

(54) APPARATUS AND METHOD FOR CONTROLLING DUTY RATIO FOR COOLING FAN ASSOCIATED MOTOR OF VEHICLE

(75) Inventors: Kazuhira Kobayashi; Tomofumi Furukawa, both of Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/832,088

(22) Filed: Apr. 11, 2001

(30) Foreign Application Priority Data

May 11, 2000 (JP) ........................................ 2000-138979

(51) Int. Cl.$^7$ ................................................. F01P 7/02
(52) U.S. Cl. .......................... 123/41.12; 62/181; 62/184
(58) Field of Search .......................... 123/41.12; 62/181, 62/183, 184

(56) References Cited

U.S. PATENT DOCUMENTS

| | | | | |
|---|---|---|---|---|
| 4,555,910 A | * | 12/1985 | Sturges | 62/184 |
| 4,590,772 A | * | 5/1986 | Nose et al. | 123/41.12 |
| 4,651,922 A | * | 3/1987 | Noba | 123/41.12 |
| 4,658,595 A | * | 4/1987 | Shimada et al. | 236/35 |
| 5,099,654 A | * | 3/1992 | Baruschke et al. | 62/180 |
| 5,799,867 A | * | 9/1998 | Misawa | 237/2 B |

FOREIGN PATENT DOCUMENTS

| DE | 198 56 615 | 6/1999 |
|---|---|---|
| JP | 11-229876 | 8/1999 |

* cited by examiner

*Primary Examiner*—Noah P. Kamen
(74) *Attorney, Agent, or Firm*—McDermott, Will & Emery

(57) ABSTRACT

In apparatus and method for controlling a cooling fan associated motor at a pulse duty ratio, the cooling fan is revolved by the cooling fan associated motor to cool a radiator of a vehicular engine coolant and a condenser of a refrigerant of a vehicular air conditioner and the duty ratio for the cooling fan associated motor is controlled in such a manner that a sum of a torque required for a generator to drive the cooling fan associated motor and a torque required to drive a compressor of the air conditioner is minimized while satisfying a control demand for a coolant temperature and a refrigerant pressure so that the cooling fan associated motor is driven at the duty ratio.

11 Claims, 5 Drawing Sheets

APPARATUS AND METHOD FOR CONTROLLING DUTY RATIO FOR COOLING FAN ASSOCIATED MOTOR OF VEHICLE

BACKGROUND OF THE INVENTION a) Field of the Invention

The present invention relates generally to controlling apparatus and method for controlling a duty ratio for a cooling fan associated motor (hereinafter, also simply referred to as a fan motor) of an automotive vehicle, particularly, relates to the controlling apparatus and method for controlling the duty ratio of the cooling fan associated motor of an engine cooling radiator and a condenser of a vehicular air conditioner.

b) Description of the Related Art

A Japanese Patent Application First Publication No. Heisei 11-229876 published on Aug. 24, 1999 exemplifies a previously proposed automotive vehicle cooling system having a cooling fan associated motor to cool a radiator and a condenser of a vehicular air conditioner through the cooling fans to cool a radiator of an engine and a condenser of the air conditioner.

A Pulse Width Modulation (PWM) is carried out by detecting a refrigerant pressure of the air conditioner and a coolant temperature and an air conditioner and calculating a duty ratio of the cooling fan in accordance with the coolant temperature and the refrigerant pressure.

SUMMARY OF THE INVENTION

However, since, in the above-described Japanese Patent Application Publication No. Heisei 11-229876, the duty ratio control for the motor is carried out with only the coolant temperature and a performance of the air conditioner taken into account, a fuel consumption of the whole vehicle often becomes worsened depending upon a situation of a motor operation.

In addition, since the cooling fan associated motor is constituted by two or more cooling fans and associated motors, a beat tone is often developed in accordance with individual product difference or fan profile difference when two or more motors are controlled at the same frequencies.

It is, hence, an object of the present invention to provide controlling apparatus and method for controlling a duty ratio of each cooling fan associated motor of an automotive vehicle.

According to one aspect of the present invention, there is provided a method for controlling a cooling fan associated motor at a pulse duty ratio, the cooling fan being revolved by the cooling fan associated motor to cool a radiator of a vehicular engine coolant and a condenser of a refrigerant of a vehicular air conditioner, the method comprising: controlling the duty ratio for the cooling fan associated motor in such a manner that a sum of a torque required for a generator to drive the cooling fan associated motor and a torque required to drive a compressor of the air conditioner is minimized while satisfying a control demand for a coolant temperature and a refrigerant pressure; and driving the cooling associated motor.

According to another aspect of the present invention, there is provided an apparatus for controlling a cooling fan associated motor at a pulse duty ratio, the cooling fan being revolved by the cooling fan associated motor to cool a radiator of a vehicular engine coolant and a condenser of a refrigerant of a vehicular air conditioner, the apparatus comprising: a controller to control the duty ratio for the cooling fan associated motor in such a manner that a sum of a torque required for a generator to drive the cooling fan associated motor and a torque required to drive a compressor of the air conditioner is minimized while satisfying a control demand for a coolant temperature and a refrigerant pressure; and a driver to drive the cooling associated motor at the duty ratio.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1A:
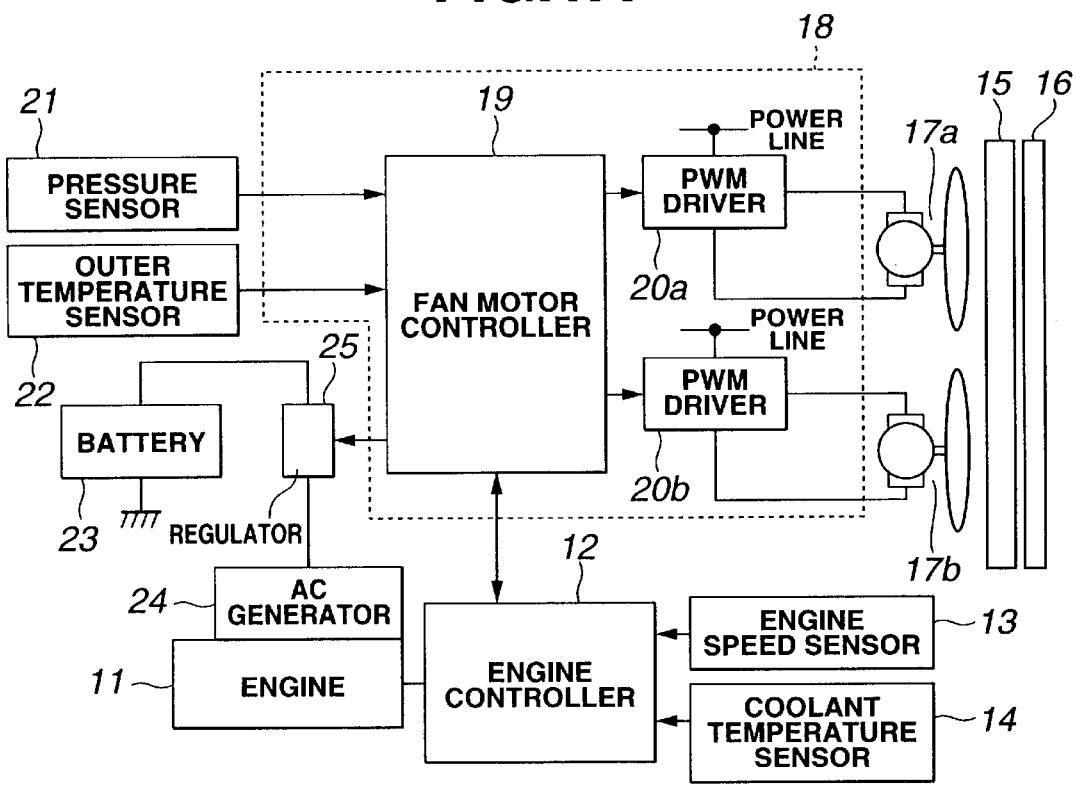
FIG. 1A is a schematic circuit block diagram of a vehicular cooling system to which a preferred embodiment of a cooling fan associated motor controlling apparatus is applicable.

FIG. 1A shows a schematic circuit block diagram of a vehicular cooling system to which a cooling fan duty ratio controlling apparatus in a preferred embodiment according to the present invention is applicable.

An engine speed sensor 13 and a coolant temperature sensor 14 are connected to an engine controller 12 to control an engine operation of an engine 11. The engine speed sensor 13 detects an engine speed and the coolant temperature 14 to detect an engine coolant temperature.

An engine coolant of the engine 11 is cooled with a radiator 15 which is arranged within an engine compartment. A condenser 16 of the air-conditioner A/C is disposed in a vehicular forward/rearward (longitudinal) direction together with the radiator 15.

A cooling fan couple 17 (17a, 17b) is associated with each corresponding motor at a rear side of the vehicle. The condenser 16 and radiator 15 are cooled in accordance with an outside air and the cooling fan couple 17 (17a, 17b).

This cooling fan couple 17 are controlled by means of a control unit 18. The control unit 18 includes: a motor fan controller 19; and a pair of PWM drivers 20 (20a, 20b) connected across each of the fan associated motors 17 (17a, 17b).

This cooling fan couple 17 are controlled by means of a control unit 18.

The control unit 18 includes: a motor fan controller 19; and a pair of PWM drivers 20 (20a, 20b) connected across each of fan associated motors 17 (17a, 17b).

The motor fan controller 19 is connected to engine controller 12 to read the engine speed Ne and coolant temperature Tw. A pressure sensor 21 and an outer temperature sensor 22 are connected to fan motor controller 19 to read a refrigerant pressure of an air conditioner and to read an outer air temperature outside the vehicle.

The fan motor controller 19 calculates a duty ratio to control a drive of fan motor couple 17 (17a, 17b) and outputs the calculated duty ratio to corresponding PWM driver 20 (20a, 20b).

Figure 2A:
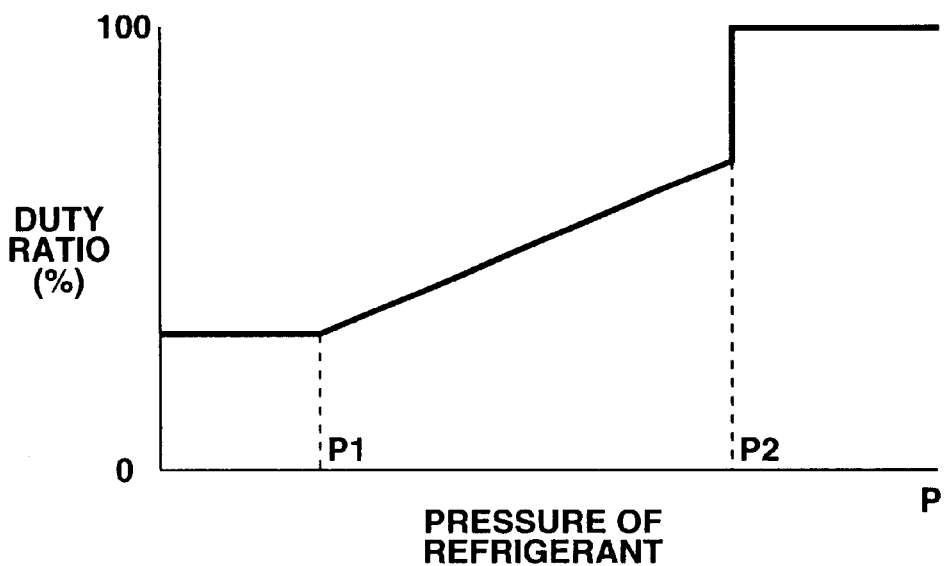
FIG. 2A is a characteristic graph of a map representing a relationship between a duty ratio for the cooling fan associated motor and a refrigerant pressure.
Figure 2B:
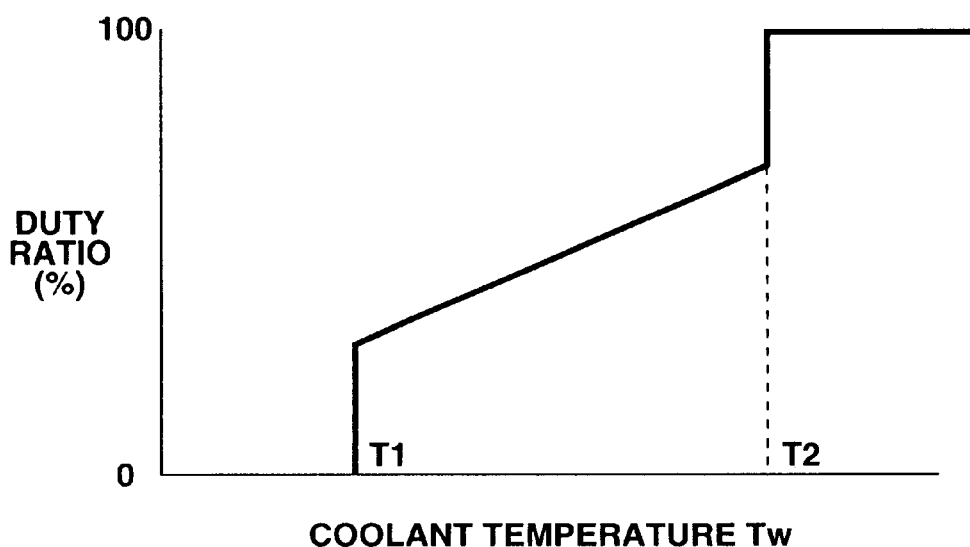
FIG. 2B is a characteristic graph of a map representing a relationship between the duty ratio and a coolant temperature.
Figure 3:
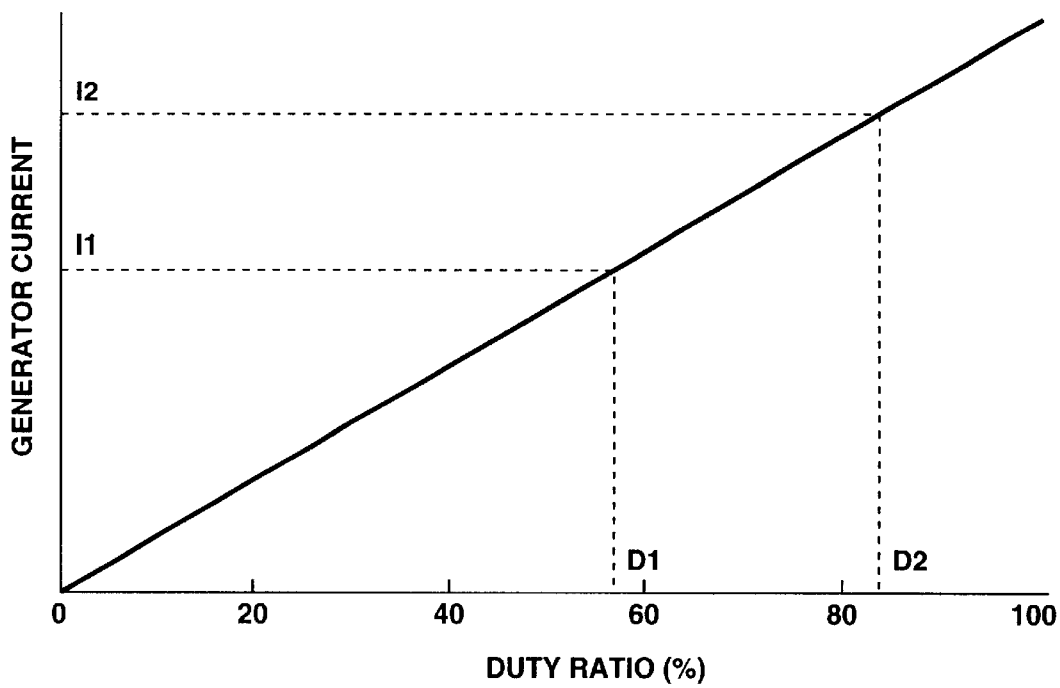
FIG. 3 is a characteristic graph of a map representing the duty ratio and a generator current.
Figure 4:
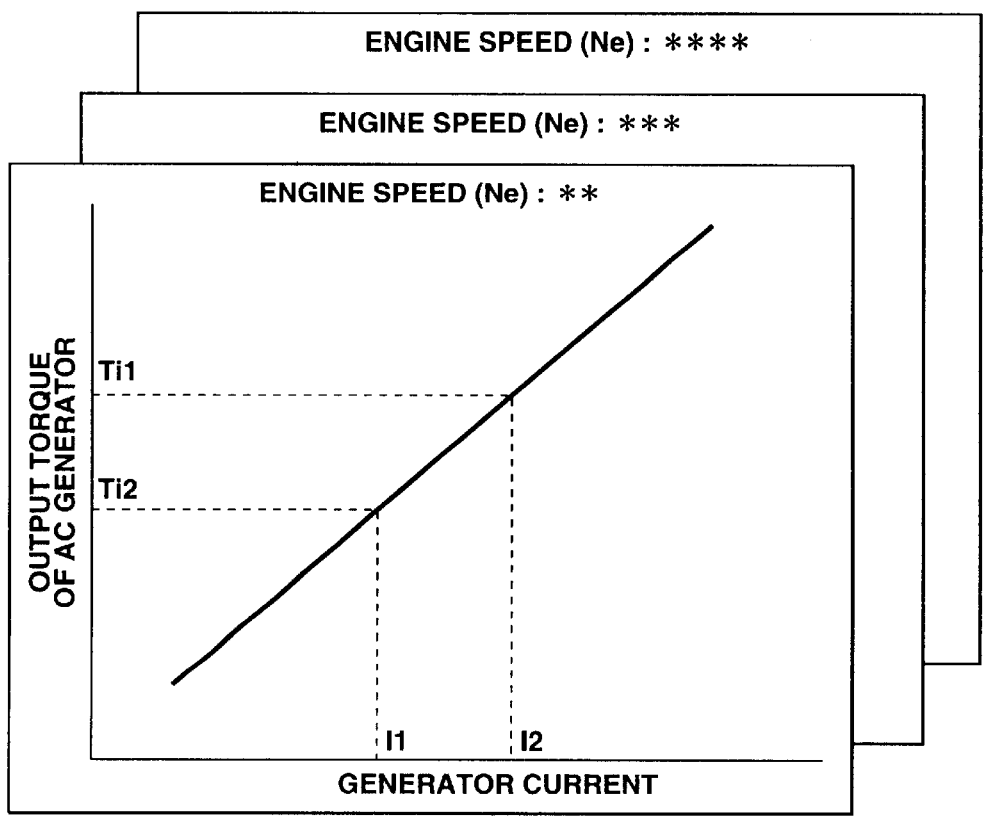
FIG. 4 is a characteristic graph of maps representing relationships between the generator's torque and generator current with engine speed as a parameter.

To calculate the duty ratio, use is made of previously prepared maps of a map representing a relationship between the duty ratio (%) and a pressure of the refrigerant for one motor (17a, 17b) shown in FIG. 2A, a map representing the relationship between the duty ratio (%) and the coolant temperature shown in FIG. 2B, a map representing a relationship between the duty ratio of the motor fan and a power generating current of the power generator shown in FIG. 3, a map representing the relationship between the power generating current of the power generator and the torque thereof shown in FIG. 4, and a map representing the relationship between the power generating current of the power generator shown in FIG. 4 and a torque of a compressor.

The PWM driver couple 20 drives the corresponding fan motor 17 with a battery voltage as a power supply upon receipt of an output of fan motor controller 19. A battery 23 charges via regulator 25 with an AC power generator 24 driven by an engine.

Figure 1B:
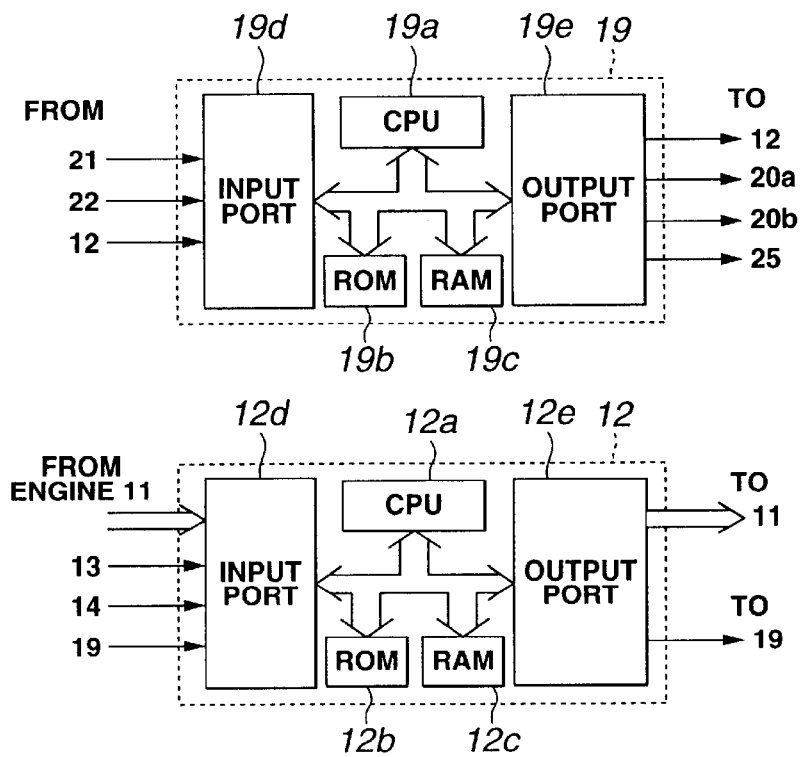
FIG. 1B is a schematic circuit block diagram of a fan motor controller and an engine controller shown in FIG. 1A.

It is noted that FIG. 1B shows an internal circuit block diagram of fan motor controller 19 and engine controller 12 and, as shown in FIG. 1B, fan motor controller 19 includes a microcomputer having a CPU 19a(Central Processing Unit), ROM 19b(Read Only Memory), RAM 19c(Random Access memory), an Input Port 19d, an Output Port 19e, and a common bus. Engine controller 12 includes the microcomputer having a CPU 12a, a ROM 12b, a RAM 12c, an Input Port 12d, and a common bus in the same manner as fan motor controller 19.

Figure 6:
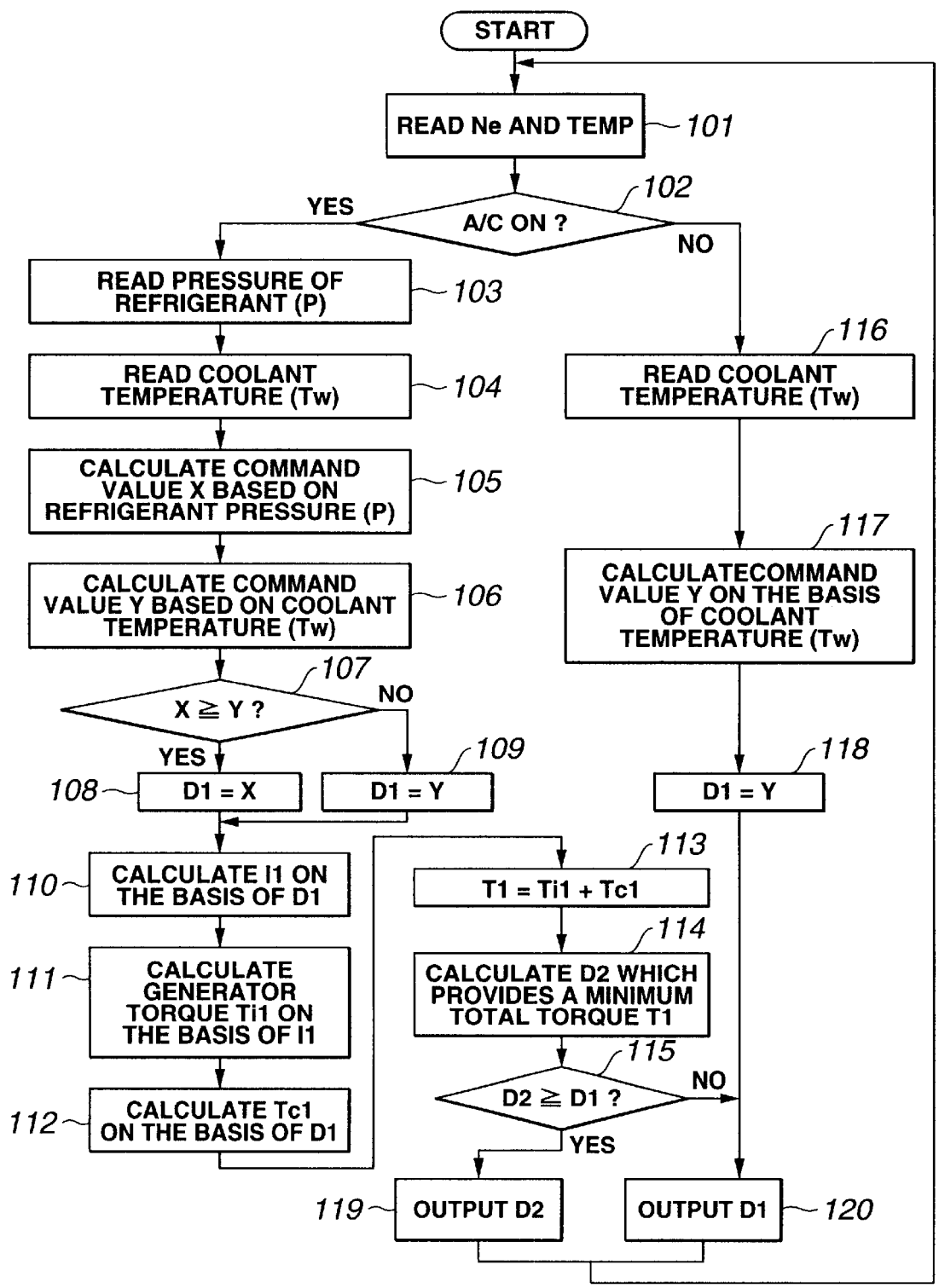
FIG. 6 is an operational flowchart for explaining an operation of the cooling fan motor controller shown in FIG. 1A.

Next, FIG. 6 shows an operational flowchart representing a control flow with the fan motor controller. The control operation in accordance with the flowchart shown in FIG. 6 is executed whenever an engine ignition switch is turned on and the engine is started.

At a step 101, fan motor controller 19 reads the engine speed Ne and the outer temperature Temp from engine controller 12.

At a step 102, fan motor controller 19 checks to see if a power switch of the air conditioner is turned to ON or OFF.

If A/C ON (yes), namely, the air conditioner is being operated at step S102, the routine goes to a step S103.

If A/C is turned to OFF (No), namely, the air conditioner is not operated, the routine goes to a step 116.

At step 103, fan motor controller 19 reads refrigerant pressure from refrigerant pressure sensor 21.

At a step 104, fan motor controller 19 reads coolant temperature Tw from engine controller 12.

At a step 105, fan motor controller 19 calculates a first command value X of a duty ratio for cooling fan associated motor 17 (17a, 17b) to satisfy a demand to the performance of the air conditioner using a map representing a relationship between the refrigerant pressure and duty ratio of fan motor shown in FIG. 2A.

In FIG. 2A, the map shows that such a characteristic that the duty ratio is constantly at about 30% when the refrigerant pressure is equal to or below P1, the duty ratio is raised in proportion to the refrigerant pressure from P1 to P2, and the constant duty ratio of 100% is continued when exceeding P2.

At a step 106, fan motor controller 19 calculates a second command value Y of a duty ratio for the fan motor to satisfy the demand to the coolant temperature Tw using a map representing the relationship between the coolant temperature and duty ratio of the motor fan shown in FIG. 2B.

In FIG. 2B, the map shows that such a characteristic is set that the fan motor is not driven with the duty ratio set to 0% when the coolant temperature is equal to or lower than T1, the duty ratio is raised in proportion to coolant temperature Tw when the coolant temperature Tw ranges from T1 to (T1 exclusive) to T2, and duty ratio of 100% is continued constantly when Tw>T2.

At a step 107, fan motor controller 19 compares first command value X with second command value Y to determine if $X \geq Y$.

If first command value X is larger than second command value Y ($X \geq Y$) (Yes) at step 107, the routine goes to a step 108.

If X<Y (No) at step 107, the routine goes to a step 109.

At step 108, fan motor controller 19 sets first command value X to a first target value D1 of duty ratio of fan motor 17(D1=X).

At a step 109, fan motor controller 19 sets the second command value to a second target value D2 of duty ratio of the fan motor. That is to say, if the duty ratio for command values X and Y which is larger than the other from among first and second command values X and Y, the fan motor can satisfy the demand of both coolant temperature and performance if the air conditioner.

At a step 110, fan motor controller 19 calculates a power generation current I1 of power generator from first target value D1 using the map representing a relationship between the duty ratio of the fan motor and power generating current of the power generator shown in FIG. 3.

In FIG. 3, the map shows such a characteristic that the power generation current at its duty ratio required to drive the fan becomes large.

At a step 111, fan motor controller 19 calculates a torque Ti1 of the power generator from power generator current I1 using the map representing the power generating current of the generator shown in FIG. 4 and the torque.

In FIG. 4, the map shows such a characteristic that, at a predetermined engine speed (namely, the revolution speed of the power generator), the torque requires to generate the current of the power generator in proportion to the magnitude of the power supply current of the power generator and prepared for each engine speed.

Figure 5:
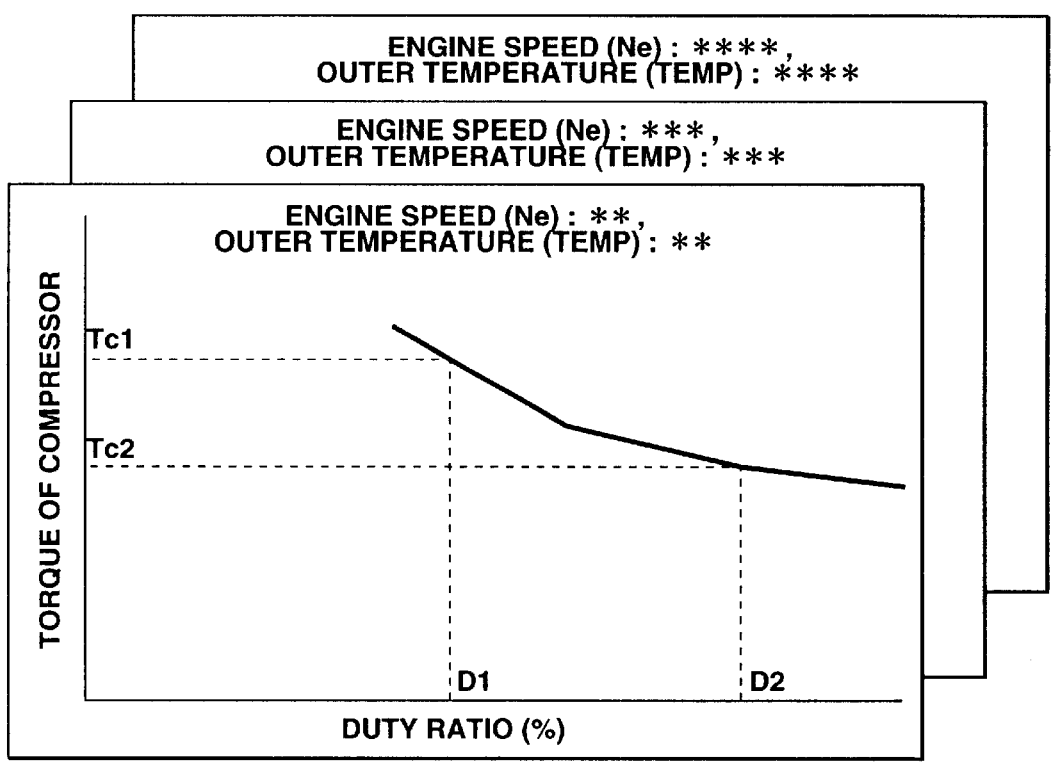
FIG. 5 is a characteristic graph of maps representing a torque of a compressor and duty ratio with the engine speed and outer temperature as parameters.

At a step 112, fan motor controller 19 calculates a torque Tc1 of compressor using a map representing the duty ratio of the fan motor and torque of the compressor shown in FIG. 5. The map shown in FIG. 5 represents the relationship between the duty ratio of the fan motor 17 and the torque of the compressor when the condenser is cooled by means of the fan motor driven at the duty ratio. As the duty ratio becomes large, the required torque is decreased. Such a map as described above is prepared for each combination of the engine speed and outer temperature. At a step 113, a total of generator's torque Ti1 and compressor's torque Tc1 is set to T1.

At a step 114, fan motor controller 19 calculates second target value D2 of the fan motor duty ratio such that a sum (total) of the generator's torque and compressor's torque becomes minimized with the operation states of the generator and compressor taken into account.

In FIG. 4, the map shows such a characteristic that, at a predetermined engine speed (namely, the revolution speed of the power generator), the torque requires to generate the current of the power generator proportion to the magnitude of the power supply current of the power generator and prepared for each engine speed.

At a step 112, fan motor controller 19 calculates a torque Tc1 of compressor using a map representing the duty ratio of cooling fan associated motor 17 and torque of the compressor shown in FIG. 5.

The map shown in FIG. 5 represents the relationship between the duty ratio of the fan motor and the torque of the compressor when the condenser is cooled by means of the fan motor driven at the duty ratio. As the duty ratio becomes large, the required torque is decreased. Such a map as described above is prepared for each combination of the engine speed and outer temperature.

At a step 113, a total of generator torque Ti1 and compressor torque Tc1 is set to T1. At a step 114, fan motor controller 19 calculates second torque value D2 of the fan motor duty ratio such that the total of the generator's torque and compressor's torque becomes minimized with the operation states of the generator and compressor taken into account.

At a step 114, fan motor controller 19 calculates second torque value D2 of the fan motor duty ratio such that the total of the generator's torque and compressor's torque becomes minimized with the operation states of the generator and compressor taken into account.

Specifically, with the duty ratio of the motor fan varied gradually from first target value D1, generator current I2 of the power generator is calculated in the same manner as step 110 and, thereafter, torque Ti2 of the power generator is calculated in the same manner as step 111 and torque Tc2 of the compressor is calculated in the same manner as step 112.

Then, after total of T2 between Ti1 and Ti2 is calculated, the duty ratio of the fan motor when T2<T1 is derived. The duty ratio when T2 is minimized is set to a second target value D2. At a step 115, fan motor controller 19 compares first target value D1 with second target value D2.

If second target value D2 is equal to or larger than first target value D1, the routine goes to a step 119. If second target value D2 is smaller than first target value D1 (D2<D1) at step 115 (No), the routine goes to a step 120.

At step 119, fan motor controller 19 outputs the duty ratio of D2 to PWM driver 20 (20a, 20b). In this case, since the load torque imposed on the engine is minimized and the duty ratio (namely, D2) of fan motor 17 which does not affect a performance of the air conditioner is used, operation states of the power generator and compressor are minimized.

At a step 120, fan motor controller 19 outputs the duty ratio of D1 to PWM driver 20 (20a, 20b).

It is noted that control unit 18 drives the two fan motors 17 (17a, 17b) at mutually different frequencies when the fan motor is controlled at the duty ratio of D1 and D2.

It is also noted that control unit 18 drives two fan motors 17 (17a, 17b) at mutually different frequencies when the fan motor is controlled at the duty ratio of D1 or D2.

On the other hand, if the power switch of the air conditioner is turned to OFF at step 102 (No), motor fan controller 19 reads coolant temperature Tw from engine controller 12.

At a step 117, motor fan controller 19 calculates second command value Y from coolant temperature read at step 116. it is noted that since the airconditioner switch is turned to OFF, first command value X is not calculated.

At a step 118, second command value Y is set to first target value D1. As described above, since the air conditioner switch is turned to OFF, second target value D2 with the operation states of the compressor taken into account is not calculated.

Thereafter, the routine goes from step 118 to step 120. It is noted that after the execution of step 119 or step 120, the routine returns to a step 101 and the present control is repeated.

In this embodiment, steps 103 and 105 are constituted by first command value calculating means, steps 104 and 106 are constituted by second command value calculating means, steps 107 through 109 are constituted by first target value setting means, steps 110 through 114 are constituted by second target value setting means, and steps 115, 119 and 120 are constituted by duty ratio determining means.

In the preferred embodiment described above, the total of the power generator torque and compressor torque is minimized while the demand to the coolant temperature and air conditioner performance satisfied. Since two fan motors 17 (17a, 17b) are controlled at different frequencies, the fan motor controller can prevent the beat tone from being developed depending upon the individual difference between the respective motors and difference in the fan profiles.

The entire contents of a Japanese Patent Application No. 2000-138979 (filed in Japan on May 11, 2000) are herein incorporated by reference. Although the invention has been described above by reference to certain embodiment of the invention, the invention is not limited to the preferred embodiment described above.

For example, although, in the preferred embodiment, the number of fan motors 17 are two, the number of fan motors may be one or three or more. Although, in the preferred embodiment, the engine speed Ne and coolant temperature Tw can be read through engine controller 12, fan motor controller 19 may directly be read thereat. A stream of control by fan motor controller 19 is not only limited to the case of the preferred embodiment in which the operation is advanced in accordance with the flowchart of FIG. 6 but also may be such that the sequence of steps 104 and 105 is reversed and that the sequence on the calculations of first command value X based on pressure refrigerant and of second command value Y based on coolant temperature.

Modifications and variations of the embodiments described above will occur to those skilled in the art in the light of the above teachings.

The scope of the invention is defined with reference to the following claims.

What is claimed is:

1. An apparatus for controlling a cooling fan associated motor at a pulse duty ratio, the cooling fan being revolved by the cooling fan associated motor to cool a radiator of a vehicular engine coolant and a condenser of a refrigerant of a vehicular air conditioner, the apparatus comprising: a controller to control the duty ratio for the cooling fan associated motor in such a manner that a sum of a torque required for a generator to drive the cooling fan associated motor and a torque required to drive a compressor of the air conditioner is minimized while satisfying a control demand for a coolant temperature and a refrigerant pressure; and a driver to drive the cooling associated motor at the duty ratio.

2. An apparatus for controlling a cooling fan associated motor at a pulse duty ratio as claimed in claim 1, wherein the controller comprises: a first command value calculating section that calculates a first command value of the duty ratio in accordance with the refrigerant pressure; a second command value calculating section that calculates a second command value of the duty ratio in accordance with the coolant pressure; a first target value setting section that sets one of the first and second command values which is larger than the other to a first target value of the duty ratio; a second target value setting section that calculates a sum of a torque of a generator and that of a compressor and sets the duty ratio which minimizes the sum as a second target value setting section; and a duty ratio determining section that determines the final duty ratio from one of the first and second target values which is larger than the other and wherein the controller controls the cooling fan associated motor at the final duty ratio.

3. An apparatus for controlling a cooling fan associated motor at a pulse duty ratio as claimed in claim 2, wherein the first command value calculating section calculates the first command value on the basis of a first map representing a relationship between the refrigerant pressure and the duty ratio, the second command value calculating section calculates the second command value on the basis of a second map representing a relationship between the coolant temperature and the duty ratio, the second target value setting section calculates the torque of the generator on the basis of third maps representing the relationship between the duty ratio and a generator current of the generator and the generator current and the torque of the generator and calculates a torque of the compressor on the basis of the map representing the relationship between the duty ratio and the compressor.

4. An apparatus for controlling a cooling fan associated motor at a pulse duty ratio as claimed in claim 3, wherein the first map has such a characteristic that when the refrigerant pressure falls in a range equal to or lower than a first predetermined value (P1), the duty ratio constantly indicates about 30%, the duty ratio is raised in proportion to the refrigerant pressure when the refrigerant pressure falls in a range exceeding the first predetermined value (P1) but equal to or below a second predetermined value (P2), and the duty ratio indicates constantly 100% when P1>P2.

5. An apparatus for controlling a cooling fan associated motor at a pulse duty ratio as claimed in claim 4, wherein the second map has such a characteristic that the duty ratio indicates 0% when the coolant temperature is equal to or lower than a third predetermined value (T1), is increased in proportion to the coolant temperature when the coolant temperature falls in a range exceeding the third predetermined value (T1) but equal to or below a fourth predetermined value (T2), and indicates constantly 100% when the coolant temperature is in excess of the fourth predetermined value (T2).

6. An apparatus for controlling a cooling fan associated motor at a pulse duty ratio as claimed in claim 5, wherein the third maps comprises a fifth map having such a characteristic that in proportion to the generator current, the duty ratio is increased and a sixth map having such a characteristic that in proportion to the generator current, the torque of the generator is increased for each engine speed.

7. An apparatus for controlling a cooling fan associated motor at a pulse duty ratio as claimed in claim 6, wherein the fourth map has a characteristic that, under predetermined compressor revolution speed and outer temperature outside the vehicle, the required torque of the compressor is decreased as the duty ratio is increased.

8. An apparatus for controlling a cooling fan associated motor at a pulse duty ratio as claimed in claim 7, wherein the cooling fan motor comprises a plurality of motors, each cooling fan being attached onto a rotor axis of the corresponding one of the motors and being faced toward the condenser of the vehicular air conditioner and the radiator juxtaposed to the condenser, both condenser and radiator being cooled by the cooling fan motor.

9. An apparatus for controlling a cooling fan associated motor at a pulse duty ratio as claimed in claim 8, wherein the driver drives the plurality of motors at the same duty ratio and at mutually different frequencies.

10. An apparatus for controlling a cooling fan associated motor at a pulse duty ratio, the cooling fan being revolved by the cooling fan associated motor to cool a radiator of a vehicular engine coolant and a condenser of a refrigerant of a vehicular air conditioner, the apparatus comprising: controlling means for controlling the duty ratio for the cooling fan associated motor in such a manner that a sum of a torque required for a generator to drive the cooling fan associated motor and a torque required to drive a compressor of the air conditioner is minimized while satisfying a control demand for a coolant temperature and a refrigerant pressure; and driving means for driving the cooling associated motor at the duty ratio.

11. A method for controlling a cooling fan associated motor at a pulse duty ratio, the cooling fan being revolved by the cooling fan associated motor to cool a radiator of a vehicular engine coolant and a condenser of a refrigerant of a vehicular air conditioner, the method comprising: controlling the duty ratio for the cooling fan associated motor in such a manner that a sum of a torque required for a generator to drive the cooling fan associated motor and a torque required to drive a compressor of the air conditioner is minimized while satisfying a control demand for a coolant temperature and a refrigerant pressure; and driving the cooling associated motor.

* * * * *